(12) United States Patent
Mori

(10) Patent No.: US 8,314,968 B2
(45) Date of Patent: Nov. 20, 2012

(54) IMAGE PROCESSING CONTROLLER AND PRINTING APPARATUS

(75) Inventor: Shunichiro Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1000 days.

(21) Appl. No.: 12/344,096

(22) Filed: Dec. 24, 2008

(65) Prior Publication Data

US 2009/0180131 A1 Jul. 16, 2009

(30) Foreign Application Priority Data

Jan. 16, 2008 (JP) ................................. 2008-006837

(51) Int. Cl.
*G06K 9/46* (2006.01)
*G06K 15/00* (2006.01)
*B41J 2/21* (2006.01)

(52) U.S. Cl. .......... 358/1.9; 358/3.03; 347/43; 382/240; 382/302

(58) Field of Classification Search ................. 358/1.13, 358/1.9; 382/240, 302; 347/43
See application file for complete search history.

(56) References Cited

U.S. PATENT DOCUMENTS

| 2003/0169441 A1* | 9/2003 | Garcia et al. | 358/1.9 |
| 2005/0046903 A1* | 3/2005 | Yoshida | 358/3.03 |
| 2006/0132538 A1* | 6/2006 | Lee et al. | 347/43 |
| 2006/0165900 A1* | 7/2006 | Edwards et al. | 118/300 |
| 2007/0003152 A1* | 1/2007 | Hoppe et al. | 382/240 |

FOREIGN PATENT DOCUMENTS

| JP | 2000-148973 | 5/2000 |
| JP | 2001-353905 | 12/2001 |
| JP | 2002-094786 | 3/2002 |
| JP | 2003-032480 | 1/2003 |

* cited by examiner

*Primary Examiner* — Akwasi M Sarpong
(74) *Attorney, Agent, or Firm* — DLA Piper LLP (US)

(57) ABSTRACT

The present invention discloses an image processing controller includes: a pixel number determining unit determining the number of print pixels included in the pixel block based on a gradation of a pixel of the pre-conversion image data; a print pixel location unit filling the pixel block with the print pixels in the rows or columns and executing a first location mode where the print image becoming a fraction in the row or column is drawn in a random direction or a second location mode where the print image becoming the fraction in the row or column is drawn near to the circumjacent pixel block having a larger number of print pixels; and a switching unit switching between the first and second location modes to be executed by the print pixel location unit based on predetermined information possessed by the pre-conversion image data.

7 Claims, 10 Drawing Sheets

| CODE (DECIMAL) | CODE (BINARY) | NUMBER OF PRINT PIXELS | ALIGNMENT INFORMATION |
|---|---|---|---|
| 0 | 0000 | 0 | - |
| 1 | 0001 | 1 | UPWARD |
| 2 | 0010 | 2 | UPWARD |
| 3 | 0011 | 3 | UPWARD |
| 4 | 0100 | 4 | UPWARD |
| 5 | 0101 | 5 | UPWARD |
| 6 | 0110 | 6 | UPWARD |
| 7 | 0111 | 7 | UPWARD |
| 8 | 1000 | 1 | DOWNWARD |
| 9 | 1001 | 2 | DOWNWARD |
| 10 | 1010 | 3 | DOWNWARD |
| 11 | 1011 | 4 | DOWNWARD |
| 12 | 0100 | 5 | DOWNWARD |
| 13 | 1101 | 6 | DOWNWARD |
| 14 | 1110 | 7 | DOWNWARD |
| 15 | 1111 | 8 | - |

FIG.5

IMAGE PROCESSING CONTROLLER AND PRINTING APPARATUS

CROSS-REFERENCE TO RELATED APPLICATIONS

The entire disclosure of Japanese Patent Application No, 2008-6837, filed Jan. 16, 2008, is expressly incorporated by reference herein.

BACKGROUND

1. Technical Field

The present invention relates to an image processing controller which converts multi-gradation raster data to high-resolution binary image data and a printing apparatus provided with the image processing controller.

2. Related Art

A printing system is known in which a photoreceptor is exposed to light beams in a pattern according to print image data, thereby forming a print image. In this printing system, both a laser print head and a light-emitting-diode (LED) print head are used for irradiating the photoreceptor with light beams. The laser print head scans laser light in a main scanning direction thereby to form a raster line. On the other hand, the LED print head includes LED arrays arranged in the main scanning direction and individually emitting light thereby to form a raster line. The above-described difference in the hardware configuration between the laser and LED print heads results in the difference between print image data formats that can be output to both heads respectively. Accordingly, in order that print image data output to the laser print head may be used in the LED print head, the data format of the print image data needs to be converted. More specifically, print image data generated for the laser print head is multi-gradation low-resolution data. The multi-gradation low-resolution print image data for the laser print head needs to be converted to high-resolution binary data in order to be usable for the LED print head. When the aforesaid conversion is executable, hardware and software resources used in a printer using a laser print head can also be used by a printer provided with an LED print head. Japanese patent application publication JP-A-2003-32480 proposes an ordinary technique for converting multi-gradation low-resolution print image data to high-resolution binary print image data. In the disclosed technique, a shaggy detecting pattern or shaggy correcting pattern is used for two-dimensional image data or a pixel value of noted pixel is determined based on upper, lower, right and left adjacent pixels.

However, in the stage of output of print image data to the laser print head, the print image data is already decomposed into one-dimensional raster data having only information about main scanning direction location. As a result, the technique disclosed by the above-mentioned publication cannot be employed. More specifically, since raster data involves only location information in the main scanning direction, pixels can be arrayed in either vertical or main scanning direction but have difficulty in being arrayed in the other direction. Furthermore, printed result has variations in color strength or moiré.

SUMMARY

As one embodiment of the present invention, pre-conversion image data with each pixel being represented in multi-gradation is converted into post-conversion image data represented by a pixel block in which each one pixel of the image data for the laser print head includes binary pixels arranged in an array of two rows and two columns or more and including one pixel representing print/non-print. A pixel number determining unit determines the number of print pixels included in the pixel block based on a gradation of a pixel of the pre-conversion image data. More specifically, the multi-gradation pixel in the pre-conversion image data is converted into the number of print images contained in the pixel block. Subsequently, a print pixel location unit fills the pixel block with the print pixels in the rows or columns. In this case, the print pixel location unit executes either a first location mode in which the print image becoming a fraction in the row or column is drawn in a random direction within the row or column or a second location mode in which the print image becoming the fraction in the row or column is drawn near to the circumjacent pixel block having a larger number of print pixels within the row or column.

According to the first and second location modes, the location of the print pixel becoming the fraction in the row or column can be prevented from being redundant. Furthermore, according to the second location mode, the print image becoming the fraction in the row or column can be located near to the circumjacent pixel block having a larger number of print pixels within the row or column. Accordingly, the print image becoming the fraction can be prevented from being isolated, whereupon a sharp edge can be reproduced. On the other hand, according to the first location mode, the print image becoming the fraction is located in a random manner. Accordingly, a soft edge can be reproduced. Either location mode can provide a rule about the location (drawing) of the print pixel in the direction perpendicular to the direction in which the pixel block is filled with the print pixels. Accordingly, even when the pre-conversion image data has only one-dimensional position information, the pre-conversion image data can be converted into post-conversion image data having two-dimensional position information including rows and columns.

Furthermore, as another embodiment of the invention, the print pixel location unit is switched between the first and second location modes based on the attribute information possessed by each pixel of the pre-conversion image data. More specifically, the print image pixels can be located using either first or second location mode suitable for the attribute of each pixel. For example, the print pixel location unit is switched between the first and second location modes based on whether the pixels of the pre-conversion image data represent a character or an image. Furthermore, as further another embodiment of the invention, the print pixel location unit may be switched between the first and second location modes based on gradation of each pixel of the pre-conversion image data. Consequently, a print image location technique can be rendered suitable for a color or a degree of luminance indicated by each pixel of the pre-conversion image data.

Furthermore, as further another embodiment of the invention, the pixel number determining unit determines the number of print pixels by determining a threshold of gradation of the pre-conversion image data. According to the threshold determination, the number of print pixels can be determined in a range of the number of pixels constituting the pixel block. As further another embodiment of the invention, the pixel number determining unit outputs to the print pixel location unit data storing a code corresponding to each combination of the number of print pixels in each pixel block and a direction in which the print pixel location unit fills each pixel block with the print pixels. According to the aforesaid code, a manner of filling the pixel block with the print pixels can be specified at the print pixel location unit. However, when the number of print pixels is 0 or the number of all pixels in the pixel block, the code is caused to correspond only to the number of print pixels. When the number of print pixels is 0 or the number of all pixels in the pixel block, the direction in which the pixel block is filled with the print pixels need not be specified. Accordingly, the code is caused to correspond only to the number of print pixels. Consequently, the number of bits representing the code can be reduced, whereby the memory capacity for storing the code can be suppressed.

As further another embodiment of the invention, the print pixel location unit may be arranged to draw the print image becoming a fraction in the row or column in a random direction within the row or column regarding all the pixel blocks. Consequently, a soft edge such as in a natural image can be reproduced while variations in color strength or moiré can be prevented in printed result. As further another embodiment of the invention, the print pixel location unit may be arranged to draw the print image becoming a fraction in the row or column near to the circumjacent pixel block having a larger number of print pixels within the row or column regarding all the pixel blocks. Consequently, a sharp edge such as in characters can be reproduced while variations in color strength or moiré can be prevented in printed result.

Furthermore, the technical idea of the present invention can be embodied as a method as well as the concrete image processing controller. More specifically, the invention can be specified as a method having steps corresponding to the respective units of the above-described image processing controller. Of course, it is needless to say that the technical idea of the invention can be embodied as a program which executes the functions corresponding to the respective units and as a recording medium on which the program is recorded. The image processing controller of the invention can be dispersively-provided in a plurality of apparatus as well as a single apparatus. Furthermore, the units of the image processing controller in accordance with the invention may be included in a printing apparatus such as printer. Additionally, a printing apparatus including the units of the image processing controller of the invention may be applied to a complex machine or mechanism provided with a scanning function, a facsimile function and the like.

BRIEF DESCRIPTION OF THE DRAWINGS

FIG. 5 is a table showing combinations the number of print images and alignment information;

DESCRIPTION OF THE EXEMPLARY EMBODIMENTS

Figure 1:
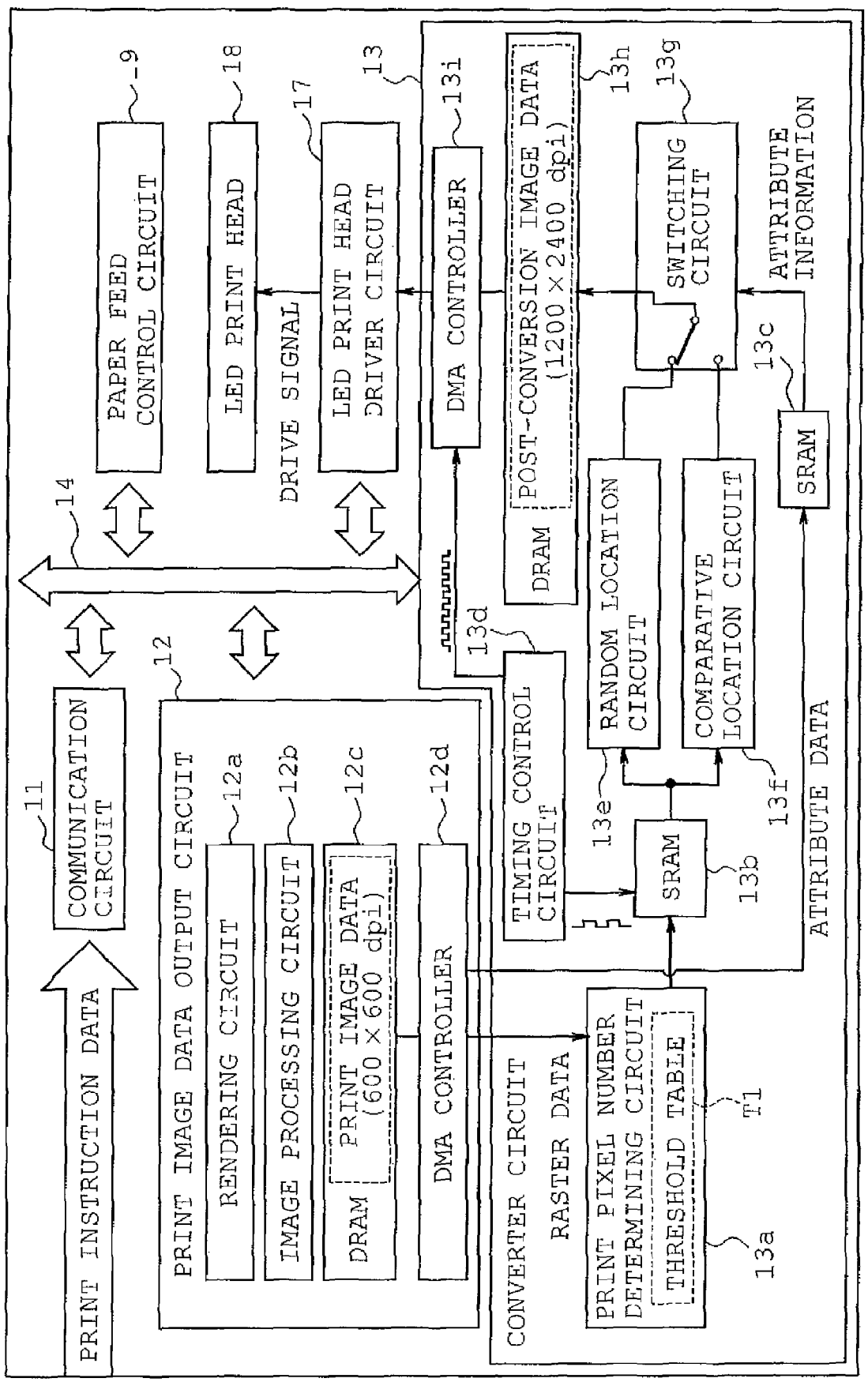
FIG. 1 is a schematic block diagram showing an electrical arrangement of a printer of an embodiment in accordance with the present invention.

An embodiment of the present invention will be described in the following sequence:

1. Embodiment;
2. Modified form 1;
3. Modified form 2;
4. Modified form 3; and
5. Modified form 4
   1. Embodiment:
   Referring to FIG. 1, a schematic electrical arrangement of a printer embodying the invention is shown. The printer 10 comprises a communication circuit 11, a print image data output circuit 12, a converter circuit 13, a bus 14, an LED print head driver circuit 17, an LED head 18 and a paper feed control circuit 19. The printer 10 is a color printer using toners of cyan (C), magenta (M), yellow (Y) and black (K) and is provided with light-emitting-diodes (LEDs) of an LED print head 18 corresponding to the CMYK colors respectively. The printer 10 further includes a drum which is exposed to light by the LED print head 18 and rollers which transfer and fuse the toners onto printing paper although neither is shown. The communication circuit 11 is a hardware component for carrying out communication in compliance with protocols such as universal serial bus (USB), transmission control protocol/internet protocol (TCP/IP) and the like. The communication circuit 11 obtains print instruction data delivered from a computer (not shown) and outputs the print instruction data to the print image data output circuit 12.

The print instruction data is generated on the computer with the use of a documenting application and graphic application and is composed of a drawing command for causing the printer 10 to draw an image to be printed, various parameters controlling the printer 10 and the like. The print image data output circuit 12 comprises a rendering circuit 12a and an image processing circuit 12b. The rendering circuit 12a carries out rendering based on the drawing command, generating print image data corresponding to a print image. The image processing circuit 12b carries out image processing including a color conversion process for converting print image data generated by the rendering circuit 12a into the CMYK system, a color adjustment process, a smoothing process, a halftone process and the like.

Figure 2:
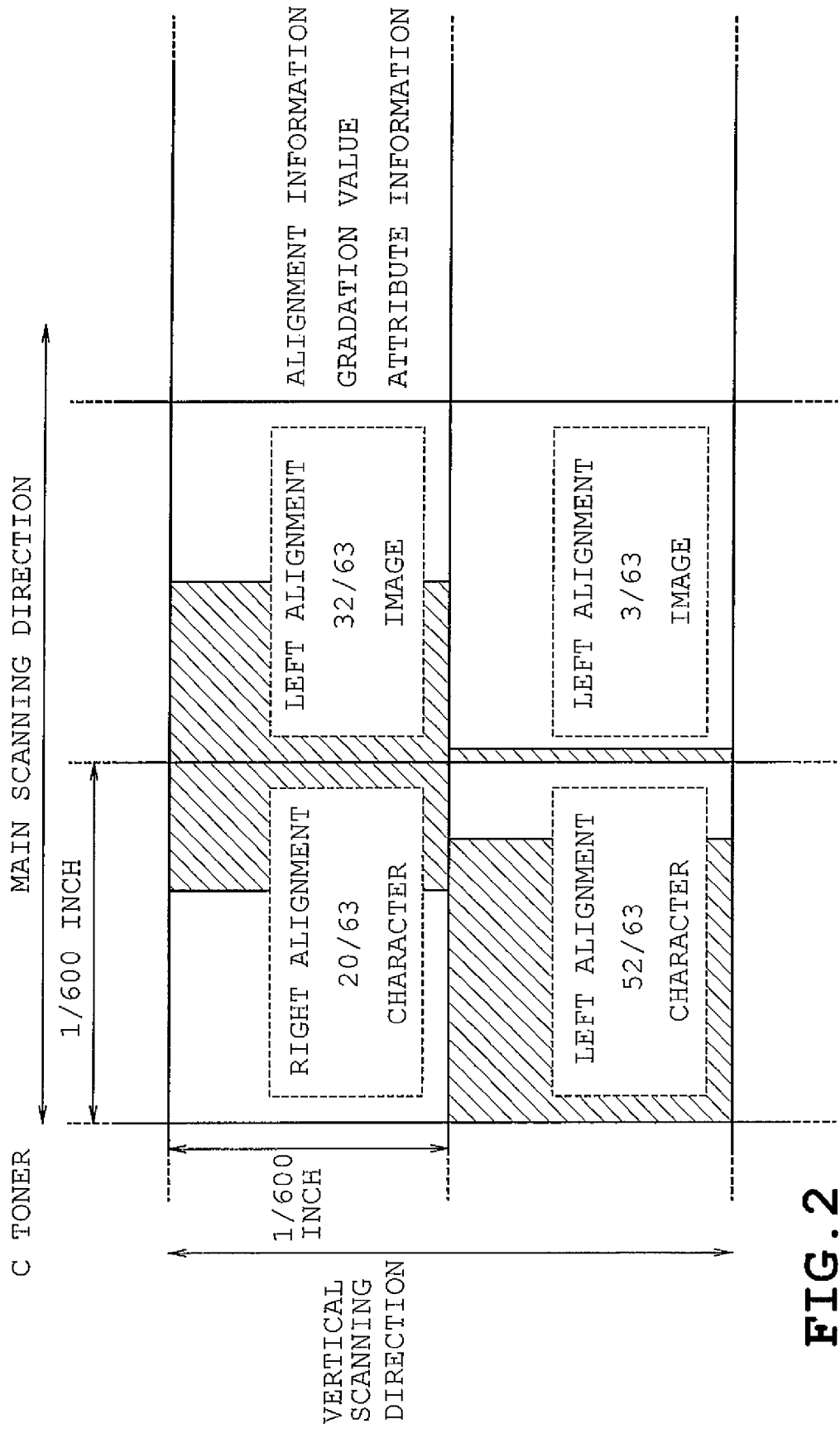
FIG. 2 shows print image data provided in the printer.

FIG. 2 schematically shows print image data or more specifically, part of print image data about a C channel. The print data is composed of a number of pixels having location information regarding a main scanning direction (right-left) and a vertical scanning direction. The print data is generated so that each pixel has a density of 600 dpi with respect to each direction. The print image data is generated on the assumption that the data is output to a laser print head. The aforesaid halftone process has been executed so that each pixel has gradation information of 64 gradations (0/63 to 63/63%: 64 bit) indicative of a toner adhesion area ratio in each pixel. Furthermore, each pixel stores alignment information for designating as to where a toner adhesion area is located as well as the toner adhesion area ratio. In the embodiment, right and left alignment directions in the main scanning direction is designated. As a result, an amount of laser with which each pixel is to be irradiated is designated with respect to a location in the main scanning direction. Furthermore, each pixel stores attribute information. The rendering circuit 12a specifies an attribute that each pixel designates a character (or its part) or an image (or its part), based on the drawing command. Data designating the attribute is stored as attribute information on each pixel.

The above-described print image data is stored on the DRAM 12c and is transferred to the converter circuit 13 for every one raster in the main scanning direction by the DMA controller 12d. The print image data for each one raster will hereinafter be referred to as "raster data." The laser print head can perform one-time main scanning based on the raster data. A period of the DMA controller 12d outputting raster data is synchronized with a period that the paper feed control circuit 19 performs paper feed four times. The raster data is assumed to be output to the laser print head. Accordingly, the raster data needs to be converted to data that can be output to the LED print head in the embodiment. The raster data serves as pre-conversion data and image data for the laser print head.

The converter circuit 13 converts the raster data to data that can be output to the LED print head 18 and comprises a print pixel number determining circuit 13a, static random access memories (SRAMs) 13b and 13c, a timing control circuit 13d, a random location circuit 13e, comparative location circuit 13f, a switching circuit 13g, a dynamic random access memory (DRAM) 13h and a direct memory access (DMA) controller 13i. The converter circuit 13 serves as an image processing controller in the invention.

Figure 3:
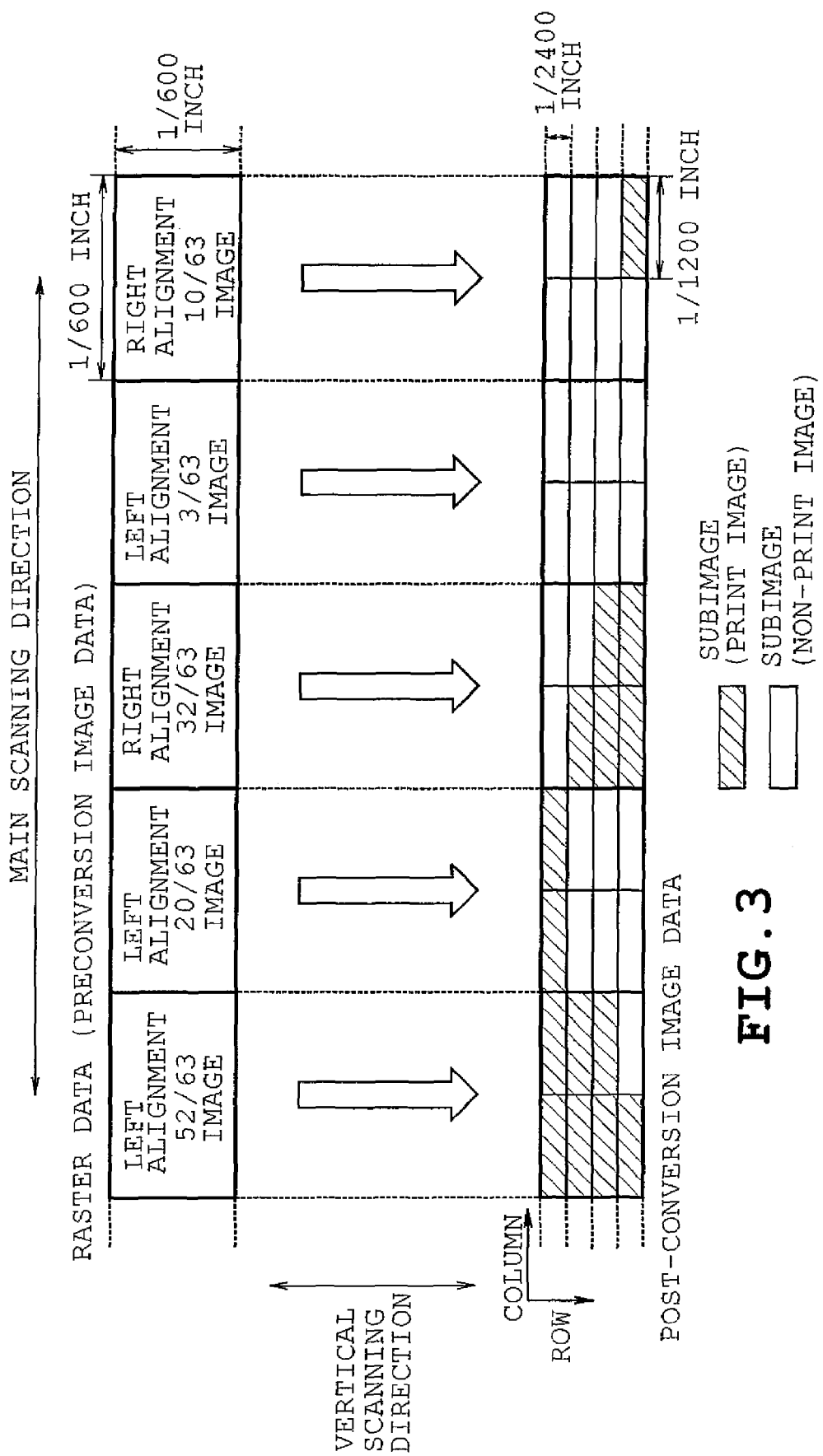
FIG. 3 is a diagram showing a conversion process executed by a converter circuit.

FIG. 3 schematically shows a conversion process executed by the converter circuit 13. The converter circuit 13 primarily carries out a resolution conversion of raster data. FIG. 3 compares resolutions before and after conversion. The raster data has a resolution of 600 dpi with respect to each direction. The converter circuit 13 is set at a double resolution (1200 dpi) with respect to the main scanning direction and at a fourfold resolution (2400 dpi) with respect to the vertical scanning direction. More specifically, one pixel of the raster data corresponds to a pixel block composed of eight post-conversion pixels in 4 rows and 2 columns. Light-emitting-diodes (LEDs) in an LED array of the LED print head are arranged at a pitch of 1200 dpi. One pixel in the pixel block in the main scanning direction corresponds to one LED. The pixels composing the pixel block will hereinafter be referred to as "sub-pixels" in order to be discriminated from the pixels of the raster data.

Based on the premise that the above-described resolution conversion is carried out, a gradation value of toner adhesion area ratio of each pixel of the raster data and alignment information are converted to the number of print pixels in a corresponding pixel block and alignment information of print pixels in the corresponding pixel block respectively. The above-mentioned print pixels are sub-pixels composing the pixel block, which means that the corresponding LEDs are turned on. More specifically, the LEDs of the LED print head 18 corresponding to the print pixels are turned on so that the drum is exposed to light. As a result, toner is transferred to corresponding locations such that toner is fused onto the locations of the print pixels on printing paper. Processing by each circuit of the converter circuit 13 will be described in detail.

The raster data is firstly input to the print pixel number determining circuit 13a. The print pixel number determining circuit 13a executes processing to determine the number of print pixels of the sub-pixels in the pixel block for ever pixel of the raster data. In synchronization with transfer of raster data, the DMA controller 12d extracts attribute data from the raster data and transfers the extracted attribute data to the SRAM 13c. The print pixel number determining circuit 13a determines the number of print pixels based on the gradation at the toner adhesion area ratio using the threshold table T1. The print pixel number determining circuit 13a serves as a print pixel determining unit in the invention.

Figure 4:
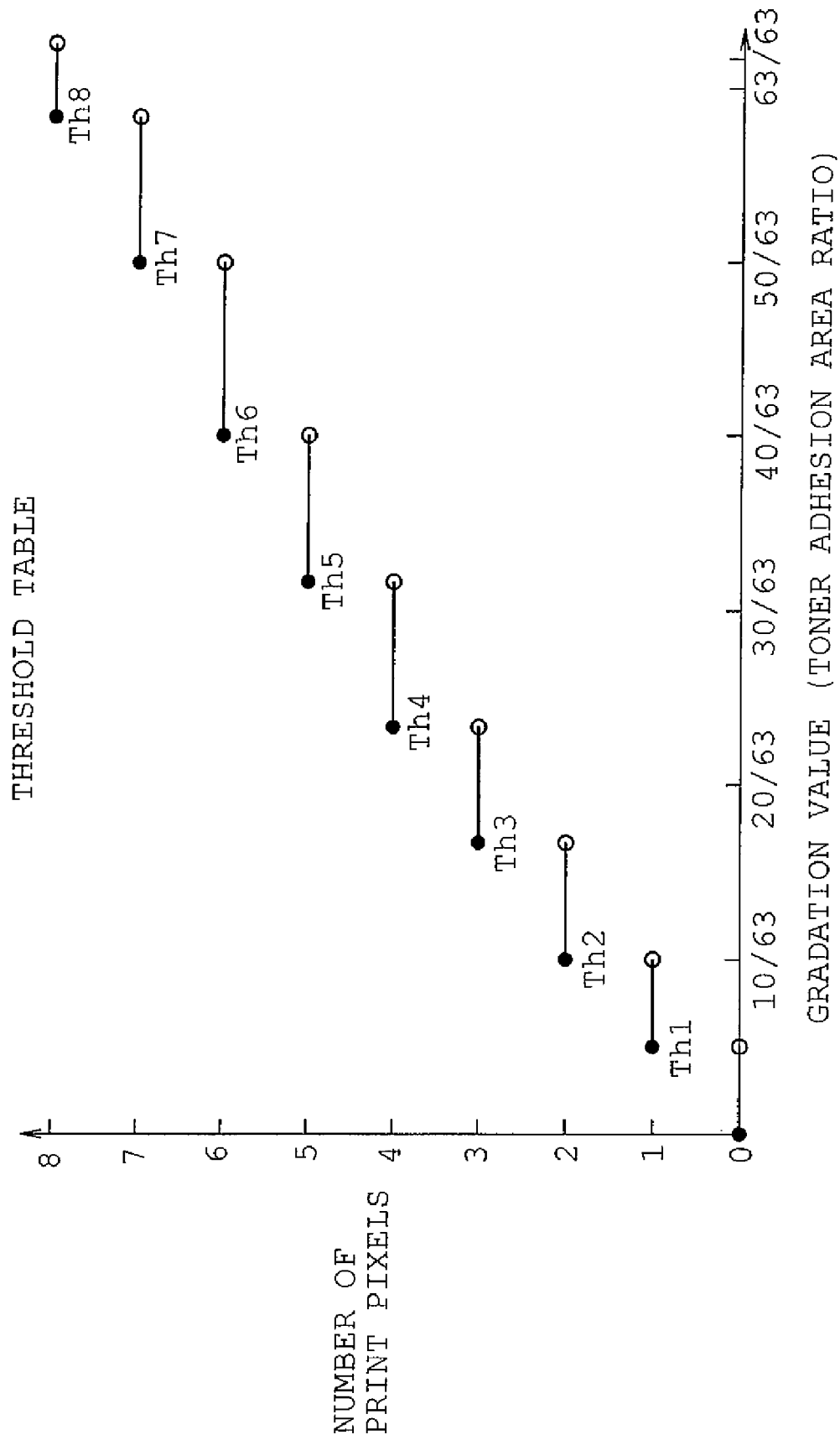
FIG. 4 is a graph showing an example of threshold table.

FIG. 4 shows an example of the threshold table T1. Axes of abscissas denote a gradation value at the toner adhesion area ratio possessed by each pixel of the raster data. Axes of ordinates denote the number of print pixels to be determined. The threshold table T1 is provided with ten threshold values th1 to th10 including minimum gradation of 0/69 and maximum gradation of 63/63. The print pixel number determining circuit 13a determines to which one of nine sections between th1 and th10 the gradation value of the toner adhesion area ratio belongs. Since the number of pixels corresponds to each section, it is possible to determine the number of print pixels (0 to 8) corresponding to the gradation value of the toner adhesion area ratio by the determination of the threshold between th1 and th10. According to the threshold table T1, since the gradation value of the toner adhesion area ratio is distributed into nine numbers of print pixels (0 to 8), the number of gradation of density representation by print pixels in a pixel block can be used laconically. The relationship between the threshold values th1 to th10 and the gradation value of toner adhesion area ratio may be linear although the relationship is non-linear in the threshold table T1 in the embodiment. Thus, various types of threshold tables T1 can be used. The print pixel number determining circuit 13a includes an alignment information conversion circuit 13a1 which obtains alignment information of each pixel in raster data and converts the alignment information into alignment information within each pixel block.

Each pixel of raster data has either right or left alignment information in the embodiment. The left alignment is converted into an upward alignment in a pixel block (upstream alignment in paper feed), whereas the right alignment is converted into a downward alignment in a pixel block (downstream alignment in paper feed). The conversion of alignment information described above is a mere example. Another conversion algorithm may be used, instead. As the result of the above-described conversion, each pixel of raster data is converted so as to have a combination of print pixel number 0 to 8 and upward or downward alignment information.

FIG. 5 shows a combination of print pixel number 0 to 8 indicated by each pixel of post-conversion raster data and upward or downward alignment information. As shown, alignment information makes no sense when no print pixel is located and when 8 print pixels are located. Accordingly, there is no problem even when alignment information is discarded regarding the cases of no print pixels and 8 print pixels. On the other hand, in the cases of one to seven print pixels, alignment information needs to be maintained since the print pixel or pixels can be upwardly or downwardly aligned. Accordingly, sixteen combinations (1(0)+1(8)+2× 7(1 to 7)=16) are effective. In the embodiment, specific codes (0 to 15) are allotted to the sixteen combinations respectively. Each pixel has information of the code as stored therein. The sub-pixel where no print pixel is located in the pixel block is a non-print pixel that does not cause LED to emit light.

Consequently, an amount of data stored by each pixel of the raster data can be reduced to 4 bit. Since the raster data is stored on the SRAM 13b, the capacity of the SRAM 13b can be reduced. Although the pixel block can be filled with the print pixels upward and downward, the locations of print pixels cannot be determined with respect to the right-and-left direction perpendicular to the up-and-down direction. When the number of print pixels is odd, a print pixel of fraction or a remainder is left by dividing the number of print pixels by the number of lines, that is, 2. The remainder is normally 1 in the embodiment. The right-and-left location of the print pixel of fraction cannot be determined at this stage. More specifically, since raster data is generated on the assumption of output to the laser print head, the raster data has location information with respect to only the main scanning direction. Accordingly, when high resolution is applied to both main scanning and vertical directions, location information with respect to both directions cannot be obtained, whereupon the location of the print pixel of fraction is unspecified in the embodiment.

The timing control circuit 13d outputs raster data via the SRAM 13b to the random location circuit 13e and the comparative location circuit 13f in synchronization with output of raster data by the DMA controller 12d. Both random location circuit 13e and comparative location circuit 13f obtain raster data and generate pixel blocks with respect to each pixel of the raster data, processing to locate the print pixels in the pixel block. In locating the print pixels, the random location circuit 13e and comparative location circuit 13f firstly obtain a code 0 to 15 stored in each pixel and further obtain the number of print pixels and alignment information both indicated by the obtained code. The random location circuit 13e and comparative location circuit 13f obtain only the number of print pixels when the number of print pixels is 0 or 8. The random location circuit 13e and comparative location circuit 13f fill the pixel block with print pixels firstly from an upward or downward location designated by the alignment information as shown in FIG. 5. In this case, an odd number of print pixels results in one print pixel of fraction as described above. The random comparison circuit 13e determines in a random manner whether the print pixel of fraction is aligned rightward or leftward, locating the print pixel of fraction (a first location mode). On the other hand, the comparative location circuit 13f locates the print pixel of fraction at the side to which a larger number of print pixel (toner adhesive area ratio) of the pixel block adjacent in the main scanning direction is adjacent (a second location mode). The random location circuit 13e and comparative location circuit 13f serve as a print pixel location unit in the invention.

Figure 6:
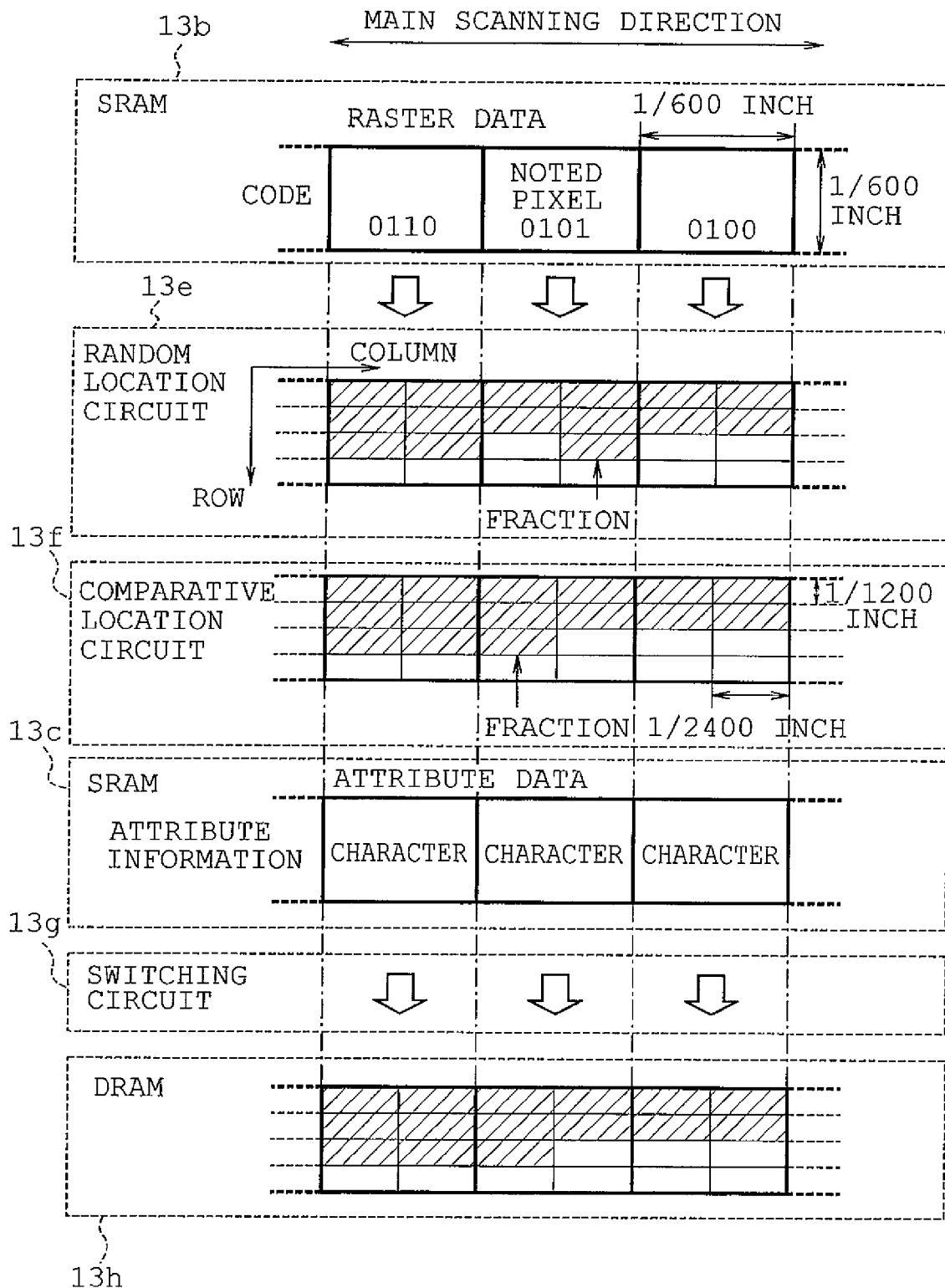
FIG. 6 shows a comparison of processings executed by a random location circuit and a surrounding comparison location circuit.

FIG. 6 shows in a comparative manner processings executed by the random location circuit 13e and the comparative location circuit 13f respectively. In FIG. 6, the noted pixel block has five print pixels and the upward alignment is set. In this case, each of the location circuits 13e and 13f fills upper two columns with print pixels, whereby the locations of four print pixels are specified. Both location circuits 13e and 13f operate in the same manner thus far. However, the location circuits 13e and 13f operate in different location manners regarding the other print pixel becoming a fraction. The random location circuit 13e determines in the random manner whether the print pixel is aligned rightward or leftward. In the shown example, the print pixel is located at a rightward aligned location by the random location circuit 13e. On the other hand, the pixel blocks adjacent to right and left sides of the noted pixel block have four and six print pixels respectively. In this case, the print pixel of fraction is aligned leftward by the comparative location circuit 13f so as to be located nearer to the left adjacent pixel block having a larger number of print pixels. Thus, the random and comparative location circuits 13e and 13f locate the print pixel of fraction at different locations and output the respective pixel blocks to the subsequent switching circuit 13g. The above-described location of the print pixels also locates the remaining sub-pixel or non-print pixel.

The switching circuit 13g obtains from the location circuits 13e and 13f the respective pixel blocks in which the print pixels are located as described above. The switching circuit 13g also obtains from the SRAM 13c attribute information corresponding to the respective obtained pixel blocks. The SAM 13c stores attribute data of extracted attribute information regarding each pixel of raster data in synchronization with the raster data. Accordingly, the attribute information corresponding to each pixel (pixel block) of raster data can be obtained. The pixel block output by the comparative location circuit 13f is selected when the attribute information indicates a character, and the pixel block output by the random location circuit 13e is discarded. On the contrary, the pixel block output by the random location circuit 13e is selected when the attribute information indicates an image, and the pixel block output by the comparative location circuit 13f is discarded. The pixel block selected by the switching circuit 13g is stored on the DRAM 13h. The switching circuit 13g serves as a switching unit in the invention. Furthermore, the switching circuit 13g switches between outputs of the random and comparative location circuits 13e and 13f, whereby the location of the print pixels determined by either location circuit 13e or 13f is carried out. The attribute information of the noted pixel indicates a character in FIG. 6. Accordingly, output of the comparative location circuit 13f is stored on the DRAM 13h.

Each of the random and comparative location circuits 13e and 13f sequentially generates pixel blocks with respect to the respective pixel blocks of the raster data, and the pixel blocks thus generated are sequentially stored on the DRAM 13h, so that image data of 1200 (main scanning direction)×2400 (vertical scanning direction) dpi serves as post-conversion image data and LED print head image data in the invention. Furthermore, each pixel of the post-conversion image data has information as to whether the pixel is a print pixel or a non-print pixel and accordingly binary image data.

The post-conversion image data stored on the DRAM 13h is transferred to the LED print head driver circuit 17 by the DMA controller 13i. In this case, the post-generation image data is transferred by every one block in a period which is a quarter of the output period of the original raster data. One raster of binary data transferred is converted to a drive signal of the LED array by the LED print head driver circuit 17. As a result, light is sequentially emitted by the LEDs of the LED print head 18 so that printing is executed on printing paper. The LED print head driver circuit 17 obtains whole post-conversion image data (corresponding to four rasters) over a period of four printing operations. In synchronization with obtainment of four rasters of the driver circuit 17, subsequent post-conversion image data corresponding to subsequent raster data is stored on the DRAM 13h. Since processing similar to the above-described is carried out for channels other than the C channel, color images can be printed using the CMYK toners. According to the random and comparative location circuits 13e and 13f, variations in color strength and moiré can be suppressed in the result of printing since the location of the print pixel of fraction is not fixed. In particular, the print pixel of fraction is located in a random manner in the case where an image such as natural image is reproduced. Consequently, a soft edge can be reproduced. On the other hand, dots can be aligned to the high density side when a character is reproduced. Consequently, a sharp edge can be reproduced.

Figure 7:
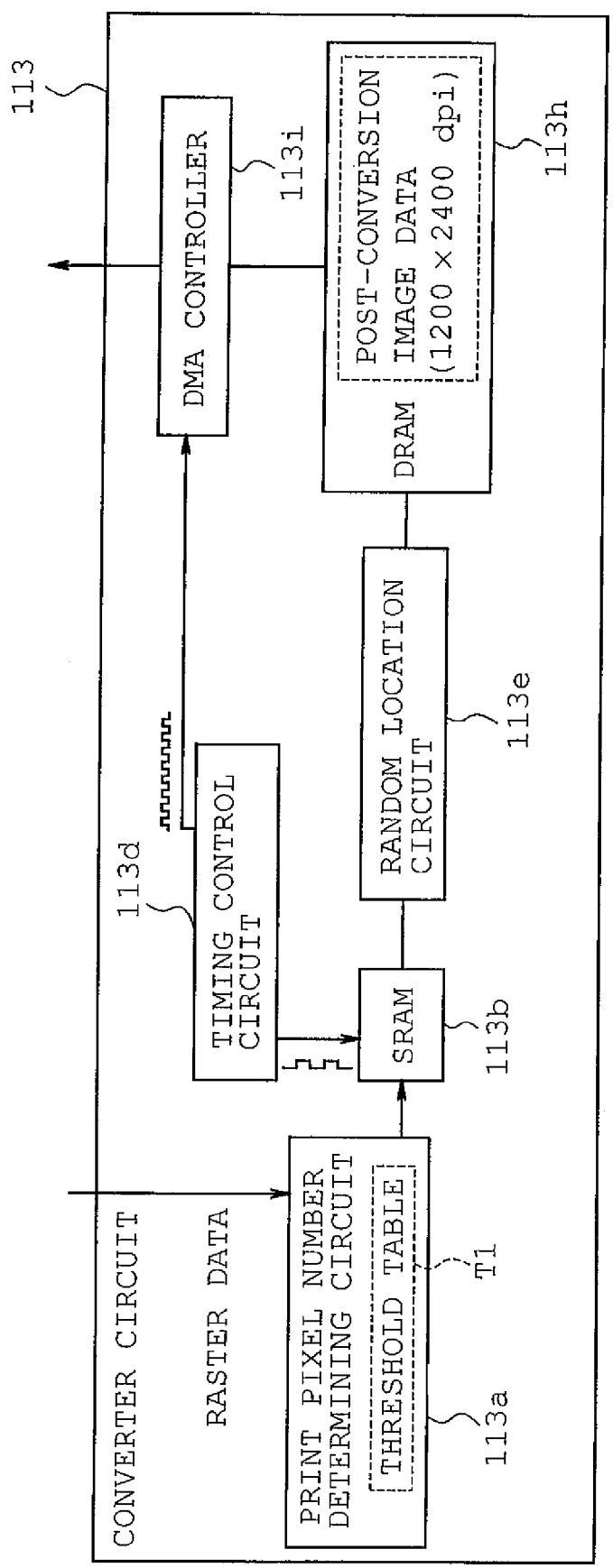
FIG. 7 is a block diagram showing an arrangement of the converter circuit in a modified form of the embodiment.

2. Modified Form 1:

FIG. 7 shows an arrangement of the converter circuit in a modified form of the embodiment. The comparative location circuit 13f, switching circuit 13g and SPAM 13c in the converter circuit 13 in the embodiment are eliminated in the converter circuit 113 as shown in FIG. 7. Accordingly, only the pixel block in which print pixels have been located by the random location circuit 113e is used for the forming of the post-conversion image data. As a result, the circuit size of the converter circuit 113 can be reduced, and variations in color strength and moiré can be suppressed in the result of printing. Additionally, a soft edge can be reproduced since the print pixel of fraction is located in a random manner.

Figure 8:
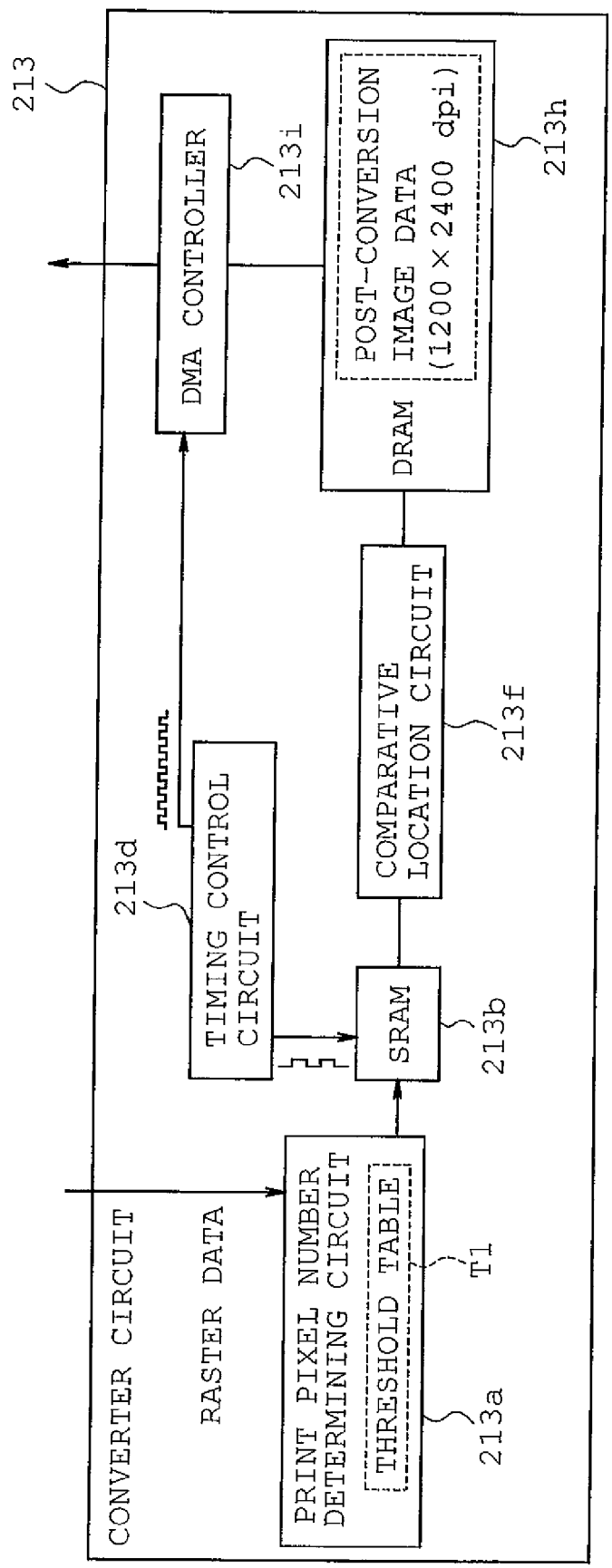
FIG. 8 is a block diagram showing an arrangement of the converter circuit in another modified form.

3. Modified Form 2:

FIG. 8 shows an arrangement of the converter circuit in another modified form of the embodiment. The random location circuit 13e, switching circuit 13g and SRAM 13c in the converter circuit 13 in the embodiment are eliminated in the converter circuit 113 as shown in FIG. 8. Accordingly, only the pixel block in which print pixels have been located by the comparative location circuit 213f is used for the forming of the post-conversion image data. As a result, the circuit size of the converter circuit 213 can be reduced, and variations in color strength and moiré can be suppressed in the result of printing. Additionally, a sharp edge can be reproduced since dots are gathered to the high density side of the image.

Figure 9:
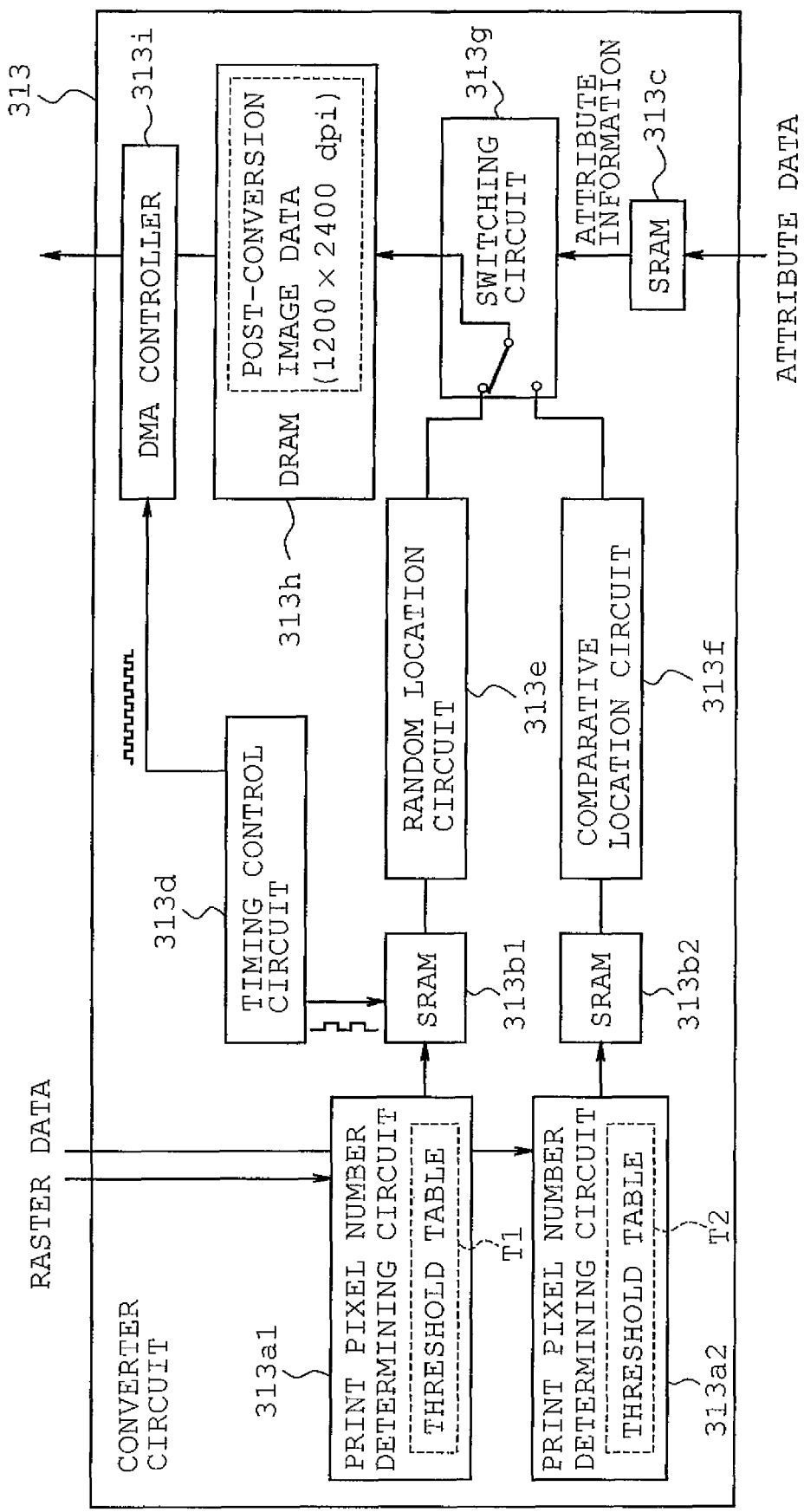
FIG. 9 is a block diagram showing an arrangement of the converter circuit in further another modified form.

4. Modified Form 3:

FIG. 9 shows an arrangement of the converter circuit in further another modified form of the embodiment. The converter circuit 313 includes two SRAMs 313b1 and 313b2, two print pixel number determining circuits 313a1 and 313a2 in addition to the arrangement of the converter circuit 13 of the foregoing embodiment. The print pixel number determining circuits 313a1 and 313a2 use the threshold tables T1 and T2 thereby to the numbers of print pixels based on the raster data, respectively. The threshold tables T1 and T2 have the same arrangement or different arrangements. Raster data is converted by the print pixel number determining circuits 313a1 and 313a2 so that each pixel has a code (0 to 15) corresponding to the combination of the number of print pixel and alignment information. The converted raster data are stored on the SRAMs 313b1 and 313b2. The SRAMs 313b 1 and 313b2 are connected to the random location circuit 313e and the comparative location circuit 313f respectively. The raster data stored on the SRAMs 313b1 and 313b2 are output to the random location circuit 313e and the comparative location circuit 313f thereby to be converted into pixel blocks, respectively. Thus, conversion may be carried out by the individual circuits.

Figure 10:
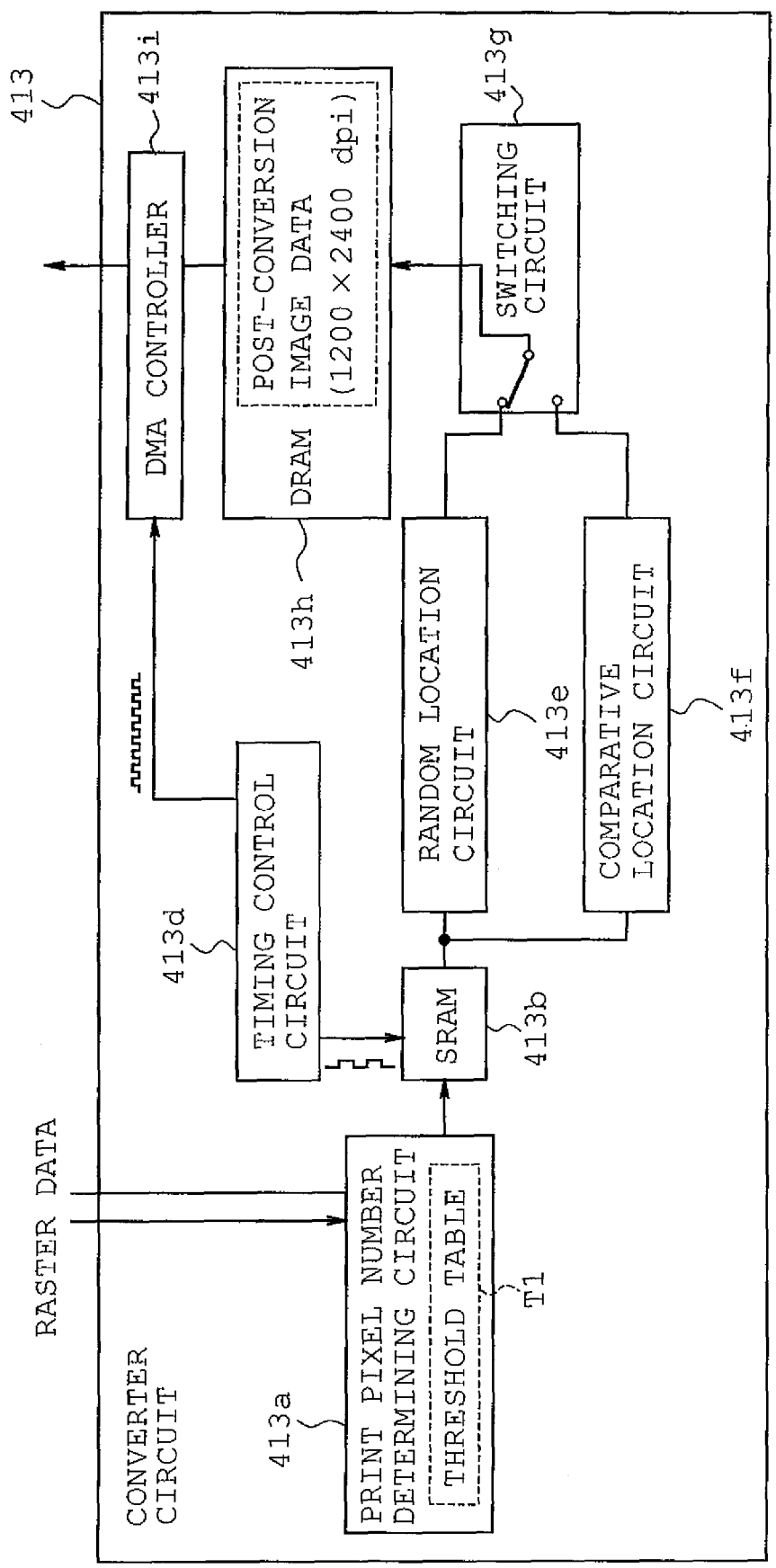
FIG. 10 is a block diagram showing an arrangement of the converter circuit in still further another modified form.

5. Modified Form 4:

FIG. 10 shows an arrangement of the converter circuit in further another modified form of the embodiment. The SRAM 13c provided in the converter circuit 13 in the foregoing embodiment is eliminated in the converter circuit 413 in the modified form 4. Since the SRAM 13c for storing attribute data is not provided in the converter circuit 413, the random and comparative location circuits 413e and 413f which output respective pixel blocks cannot be switched therebetween on the basis of attribute information. As a result, the switching circuit 413g in modified form 4 switches between the random and comparative location circuits 413e and 413f based on the number of print pixels in the pixel block. For example, output of the comparative location circuit 41S3f is selected when the number of print pixels (gradation of toner adhesion area ratio) is larger. On the other hand, output of the random location circuit 413e is selected when the number of print pixels (gradation of toner adhesion area ratio) is smaller. The random and comparative location circuits 413e and 413f may not be switched therebetween for every pixel. For example, the random and comparative location circuits 413e and 413f may be switched therebetween for every print pixel data.

What is claimed is:

1. An image processing controller which converts pre-conversion image data with each pixel being represented in multi-gradation into post-conversion image data with each pixel being represented by binary to indicate a print pixel or a non-print pixel, the post-conversion image data being higher resolution than the pre-conversion image data in a row direction and a column direction, a pixel block consisting of pixels arranged in an array of two rows and two columns or more in the post-conversion image data is corresponding to one pixel in the pre-conversion image data, the image processing controller comprising:

a pixel number determining unit that determines the number of print pixels included in the pixel block based on a gradation of a pixel of the pre-conversion image data;

a print pixel location unit that
fills the pixel block with the print pixels from one side of both ends of one direction of the row direction or the column direction in the pixel block,
and if a remainder is left when the number of print pixels is divided by a number of pixels in a direction perpendicular to the one direction in the pixel block, executes either a first location mode in which a print pixel of the remainder that is nearest to other side of the both ends of the one direction is randomly located at any one side of both ends of the direction perpendicular to the one direction in the pixel block or a second location mode in which the print pixel of the remainder is located at one side near to a circumjacent pixel block having a larger number of print pixels of the both ends of the direction perpendicular to the one direction in the pixel block; and a switching unit that switches between the first and second location modes to be executed by the print pixel location unit based on predetermined information possessed by the pre-conversion image data.

2. The controller according to claim 1, wherein the switching unit switches between the first and second location modes based on attribute information possessed by each pixel of the pre-conversion image data, 3. The controller according to claim 1, wherein the switching unit switches between the first and second location modes based on a gradation possessed by each pixel of the pre-conversion image data.

4. The controller according to claim 1, wherein the pixel number determining unit determines the number of print pixels by determining a threshold of gradation of the pre-conversion image data.

5. The controller according to claim 1, wherein
the pixel number determining unit outputs to the print pixel location unit data storing a code corresponding to each combination of the number of print pixels in each pixel block and a direction in which the print pixel location unit fills each pixel block with the print pixels, the code corresponding only to the number of print pixels when the number of print pixels is 0 or the number of all pixels in the pixel block, and
the print pixel location unit fills each pixel block with the print pixels on the basis of the code.

6. An image processing controller which converts pre-conversion image data with each pixel being represented in multi-gradation into post-conversion image data with each pixel being represented by binary to indicate a print pixel or a non-print pixel, the post-conversion image data being higher resolution than the pre-conversion image data in a row direction and a column direction, a pixel block consisting of pixels arranged in an array of two rows and two columns or more in the post-conversion image data is corresponding to one pixel in the pre-conversion image data, the image processing controller comprising:

a pixel number determining unit that determines the number of print pixels included in the pixel block based on a gradation of a pixel of the pre-conversion image data; and a print pixel location unit that
fills the pixel block with the print pixels from one side of both ends of one direction of the row direction or the column direction in the pixel block, and if a remainder is left when the number of print pixels is divided by a number of pixels in a direction perpendicular to the one direction in the pixel block, locates randomly a print pixel of the remainder that is nearest to other side of the both ends of the one direction at any one side of both ends of the direction perpendicular to the one direction in the pixel block.

7. An image processing controller which converts pre-conversion image data with each pixel being represented in multi-gradation into post-conversion image data with each pixel being represented by binary to indicate a print pixel or a non-print pixel, the post-conversion image data being higher resolution than the pre-conversion image data in a row direction and a column direction, a pixel block consisting of pixels arranged in an array of two rows and two columns or more in the post-conversion image data is corresponding to one pixel in the pre-conversion image data, the image processing controller comprising:

a pixel number determining unit that determines the number of print pixels included in the pixel block based on a gradation of a pixel of the pre-conversion image data; and a print pixel location unit that fills the pixel block with the print pixels from one side of both ends of one direction of the row direction or the column direction in the pixel block, and if a remainder is left when the number of print pixels is divided by a number of pixels in a direction perpendicular to the one direction in the pixel block, locates a print pixel of the remainder that is nearest to other side of the both ends of the one direction at one side near to a circumjacent pixel block having a larger number of print pixels of both ends of the direction perpendicular to the one direction in the pixel block.

\* \* \* \* \*